(12) United States Patent
Patterson et al.

(10) Patent No.: US 9,249,760 B2
(45) Date of Patent: Feb. 2, 2016

(54) METHOD FOR REMOVING TRACE LEVELS OF OXYGEN FROM DIRECT COMBUSTION DEVICE COMBUSTION PRODUCTS

(71) Applicant: CONOCOPHILLIPS COMPANY, Houston, TX (US)

(72) Inventors: John C. Patterson, Commerce, TX (US); David A. Brown, Katy, TX (US)

(73) Assignee: ConocoPhillips Company, Houston, TX (US)

(*) Notice: Subject to any disclaimer, the term of this patent is extended or adjusted under 35 U.S.C. 154(b) by 0 days.

(21) Appl. No.: 14/336,749

(22) Filed: Jul. 21, 2014

(65) Prior Publication Data
US 2015/0020763 A1    Jan. 22, 2015

Related U.S. Application Data

(60) Provisional application No. 61/856,456, filed on Jul. 19, 2013.

(51) Int. Cl.
| | |
|---|---|
| *F02M 25/028* | (2006.01) |
| *F01N 3/08* | (2006.01) |
| *F02B 47/02* | (2006.01) |
| *E21B 43/16* | (2006.01) |
| *E21B 43/24* | (2006.01) |

(52) U.S. Cl.
CPC ............ *F02M 25/028* (2013.01); *E21B 43/168* (2013.01); *E21B 43/2406* (2013.01); *F01N 3/0864* (2013.01); *F02B 47/02* (2013.01)

(58) Field of Classification Search
CPC .......... F02B 41/00; F02B 45/06; F02B 47/02; F02B 47/06; F02M 25/028; F02M 25/022; F02M 25/10; F02M 21/08; F01N 3/0864; F01N 2570/16

USPC .......... 123/1 R, 1 A, 2, 3, 25 A; 60/272, 282, 60/297, 311
See application file for complete search history.

(56) References Cited

U.S. PATENT DOCUMENTS

| | | | |
|---|---|---|---|
| 1,832,401 A | 8/1925 | Lamb | |
| 5,167,835 A | 12/1992 | Harder | |
| 6,510,693 B2 * | 1/2003 | Winkler | F02C 3/22 60/39.182 |
| 7,043,920 B2 * | 5/2006 | Viteri | B60K 6/24 60/39.6 |
| 7,694,736 B2 | 4/2010 | Betzer Tsilevich | |
| 2007/0202452 A1 | 8/2007 | Rao | |
| 2008/0190607 A1 | 8/2008 | Minnich et al. | |
| 2009/0260585 A1 * | 10/2009 | Hack et al. | 122/7 R |
| 2010/0212894 A1 | 8/2010 | Latimer et al. | |
| 2011/0005751 A1 | 1/2011 | Audibert-Hayet | |
| 2012/0067048 A1 * | 3/2012 | Mishima et al. | 60/670 |

OTHER PUBLICATIONS

International Search Report. PCT/US 14/47462. Dated Nov. 5, 2014.

* cited by examiner

*Primary Examiner* — Lindsay Low
*Assistant Examiner* — Grant Moubry
(74) *Attorney, Agent, or Firm* — ConocoPhillips Company

(57) ABSTRACT

A method for removing trace levels of oxygen from combustions products includes delivering fuel, oxidant and water into a direct combustion device. The fuel, oxidant and water are combusted in the direct combustion device to produce the combustion products. The combustion products include steam with trace levels of oxygen. The combustion products are then delivered to a scrubber for removal of oxygen. The scrubber includes a material capable of reacting with the oxygen.

4 Claims, 4 Drawing Sheets

METHOD FOR REMOVING TRACE LEVELS OF OXYGEN FROM DIRECT COMBUSTION DEVICE COMBUSTION PRODUCTS

CROSS-REFERENCE TO RELATED APPLICATIONS

This application is a non-provisional application which claims benefit under 35 USC §119(e) of and priority to U.S. Provisional Application Ser. No. 61/856,456 filed 19 Jul. 2013, entitled "METHOD FOR REMOVING TRACE LEVELS OF OXYGEN FROM DIRECT COMBUSTION DEVICE COMBUSTION PRODUCTS," which is incorporated by reference herein in its entirety

FIELD OF THE INVENTION

A method for removing trace levels of oxygen from combustions products.

BACKGROUND OF THE INVENTION

Conventional, oil recovery involves drilling a well and pumping a mixture of oil and water from the well. Oil is separated from the water and the water is usually injected into the subsurface formation. Conventional recovery works well for low viscosity oil. However, conventional oil recovery processes do not work well for higher viscosity, or heavy oil.

Enhanced oil recovery processes employ thermal methods to improve the recovery of heavy oils from subsurface reservoirs. The injection of steam into heavy oil bearing formations is a widely practiced enhanced oil recovery method. Typically, several tonnes of steam are required for each tonne of oil revered. Steam heats the oil in the reservoir, which reduces the viscosity of the oil and allows the oil to flow to a collection well. After the steam fully condenses and mixes with the oil, the condensed steam is classified as produced water. The mixture of oil and produced water that flows to the collection well is pumped to the surface. Oil is separated from the water by conventional processes employed in conventional oil recovery operations.

Steam assisted gravity drainage (SAGD) provides is a relatively new oil recovery process for producing heavy oil, which ideally utilizes 100% quality steam for injection into well (i.e., no liquid water). Once injected into the well, the 100% quality steam transfers heat to the heavy oil upon condensation. The heavy oil with reduced viscosity drains together with steam condensate and is recovered via a producer well, disposed parallel and beneath the injector well.

Other heavy oil recovery methods that utilize steam include cyclic steam stimulation (CSS) and steam flooding.

Steam generation costs limit economic returns of the SAGD, CSS and steam flooding. Relative to conventional boiler or once through steam generation approaches, direct steam generation may facilitate lowering these costs due to improvements in efficiency, inherent makeup water replacement and reduced fouling issues. Direct steam generation operates by burning a fuel in a combustor and quenching resulting combustion products with water to produce a mixture of steam and the combustion products including any unconsumed trace amounts oxygen.

Oxygen mixed in the steam is highly corrosive to the carbon steel materials used in conventional oilfield production systems. Methods for reducing the impact of the presence of oxygen include changing the metallurgy of the facilities to use an oxygen resistant material or utilizing chemical corrosion prevention treatment to coat the exposed surface of carbon steel. However, such methods may have high capital cost and potentially limited benefit at high temperatures.

Therefore, a need exists for removing trace levels of oxygen from the mixture of steam and combustion products.

SUMMARY OF THE INVENTION

In an embodiment, fuel, oxidant and water are delivered into a direct combustion device. The fuel, oxidant and water are combusted in the direct combustion device to produce a combustion products stream. The combustion products stream includes steam with trace levels of oxygen. The combustion products stream is then delivered to a scrubber for removal of oxygen, wherein the scrubber. The scrubber includes a material capable of reacting with the oxygen.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE INVENTION

Reference will now be made in detail to embodiments of the present invention, one or more examples of which are illustrated in the accompanying drawings. Each example is provided by way of explanation of the invention, not as a limitation of the invention. It will be apparent to those skilled in the art that various modifications and variations can be made in the present invention without departing from the scope or spirit of the invention. For instance, features illustrated or described as part of one embodiment can be used in another embodiment to yield a still further embodiment. Thus, it is intended that the present invention cover such modifications and variations that come within the scope of the appended claims and their equivalents.

An oxidizing agent, fuel and water are delivered to a direct combustion device (such as a direct steam generator), which operates by burning the fuel and quenching the resulting products with water to produce combustion products that includes steam. As previously discussed, the steam includes trace levels of oxygen which may be highly corrosive to oilfield production systems.

A scrubber is utilized to remove the trace levels of oxygen from the mixture of steam and combustion products before being introduced to the oilfield production systems. The scrubber may be integrated into a combustion product separator, or may be used without a combustion product separator.

The scrubber may be packed with material that will react with the trace amount of oxygen present. For example, the material may be a low quality iron that is highly susceptible to oxygen corrosion. For efficient performance, the material may have a high surface area to allow the maximum contact with the entrained oxygen. The material may be structured to present a minimum resistance to flow. Examples of suitable material structures include, but are not limited to, a wool structure similar to steel wool, a series of fine mesh wire, thin walled solid pickings similar to raschig rings and other structure with relatively high surface area to mass ratio.

To prevent oxygen corrosion ahead of the point that all the oxygen has been removed from the combustion product stream, facilities ahead of this point may be constructed of a corrosion resistant material. Such facilities may include, but are not limited to, flow lines, effluent separators, and casing or supporting structures of the scrubber.

Figure 1:
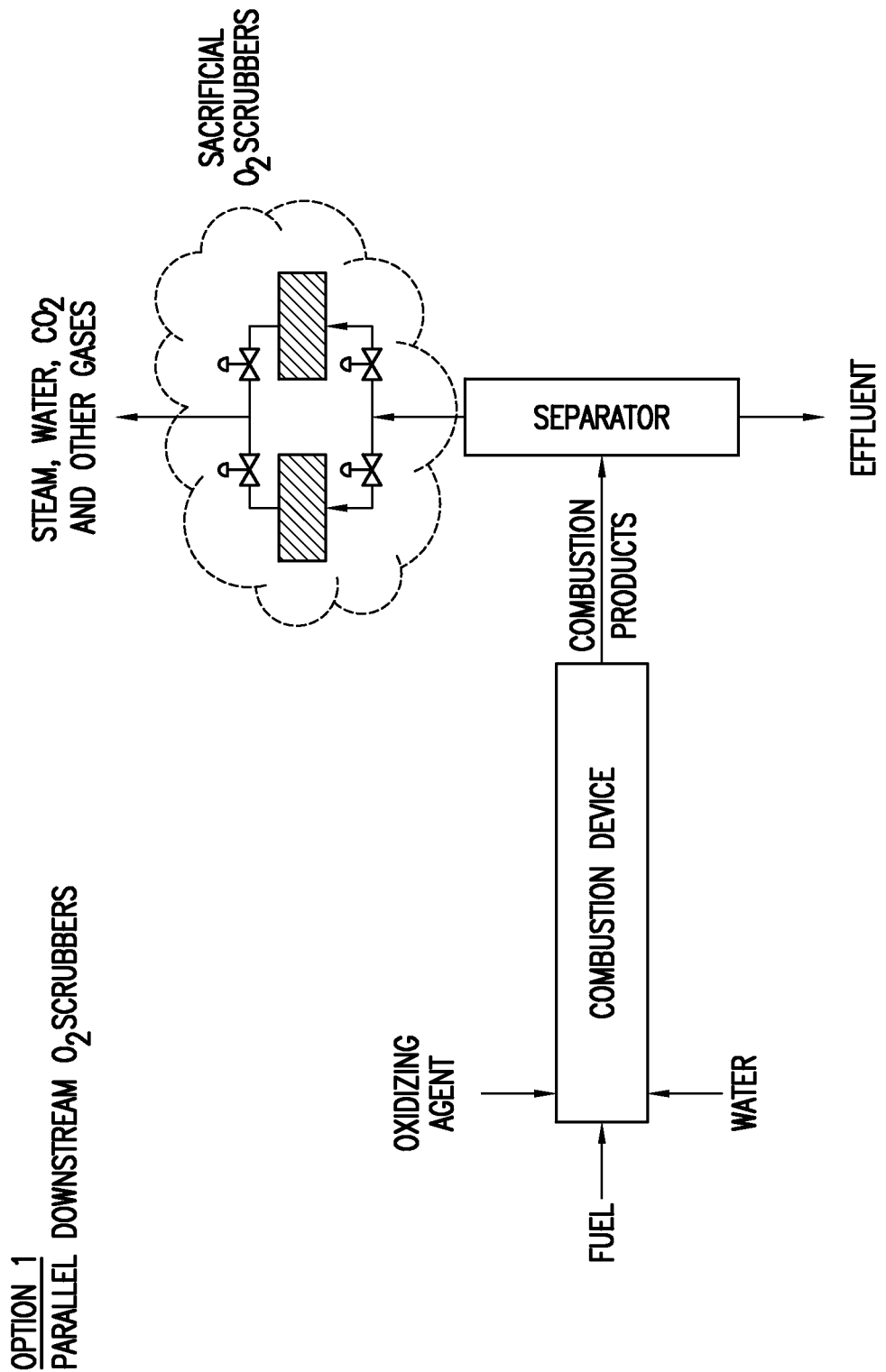
FIG. 1 is a schematic for the removal of oxygen from a combustion product stream via parallel downstream scrubbers, according to one embodiment of the invention.

FIG. 1 depicts an embodiment wherein parallel downstream scrubbers are utilized. Specifically, the oxidizing agent, fuel and water are delivered to the direct combustion device. The resulting combustion products stream, which includes steam with trace levels of oxygen, is fed into a separator. The separator removes any effluent present and delivers the resulting stream to the scrubbers for oxygen removal.

Figure 2:
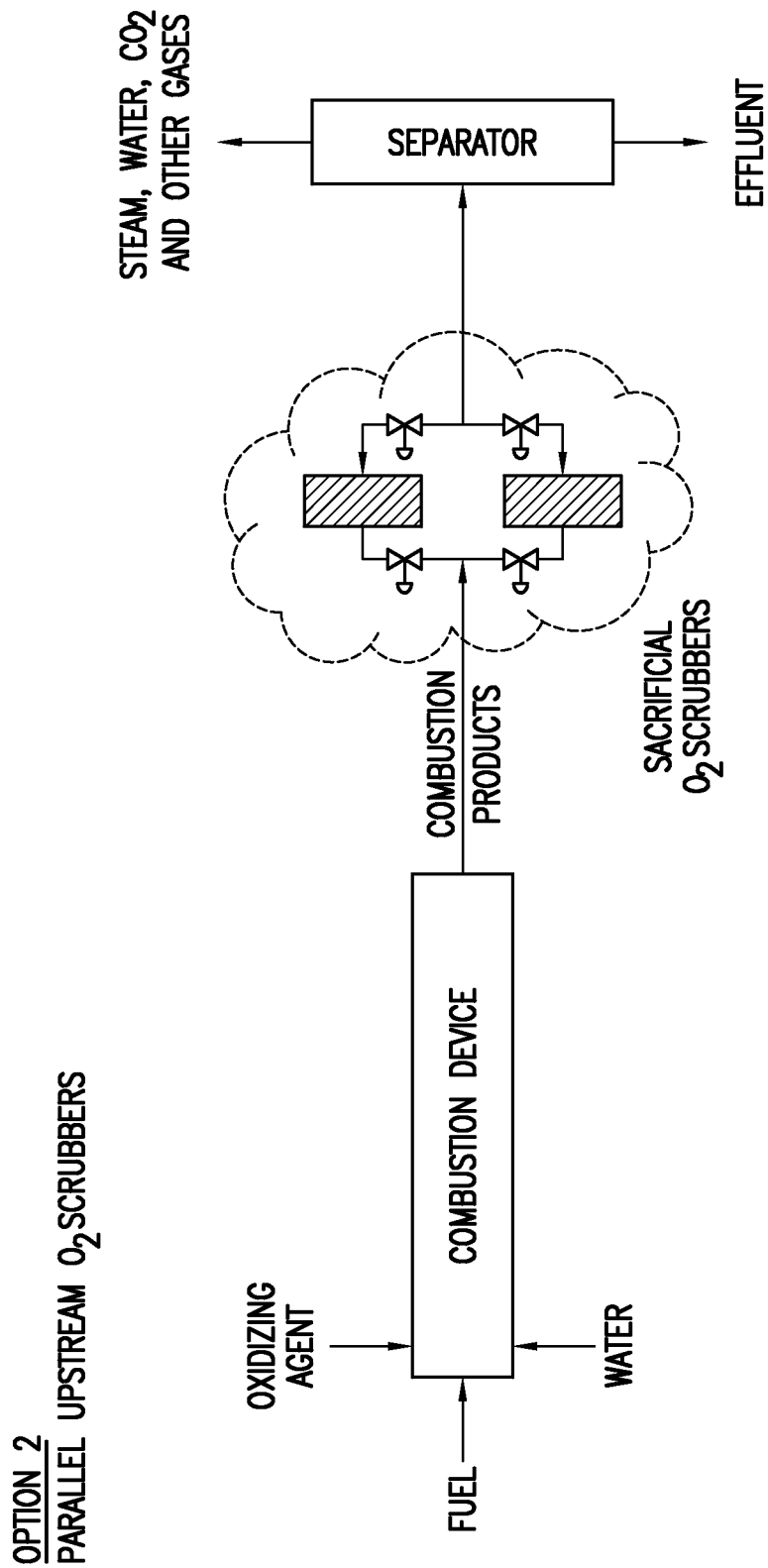
FIG. 2 is a schematic for the removal of oxygen from a combustion product stream via parallel upstream scrubbers, according to one embodiment of the invention.

FIG. 2 depicts an embodiment wherein parallel upstream scrubbers are utilized. Specifically, the oxidizing agent, fuel and water are delivered to the direct combustion device. The resulting combustion products stream, which includes steam with trace levels of oxygen, is fed into the scrubbers for oxygen removal. The resulting stream is then delivered to a separator.

Figure 3:
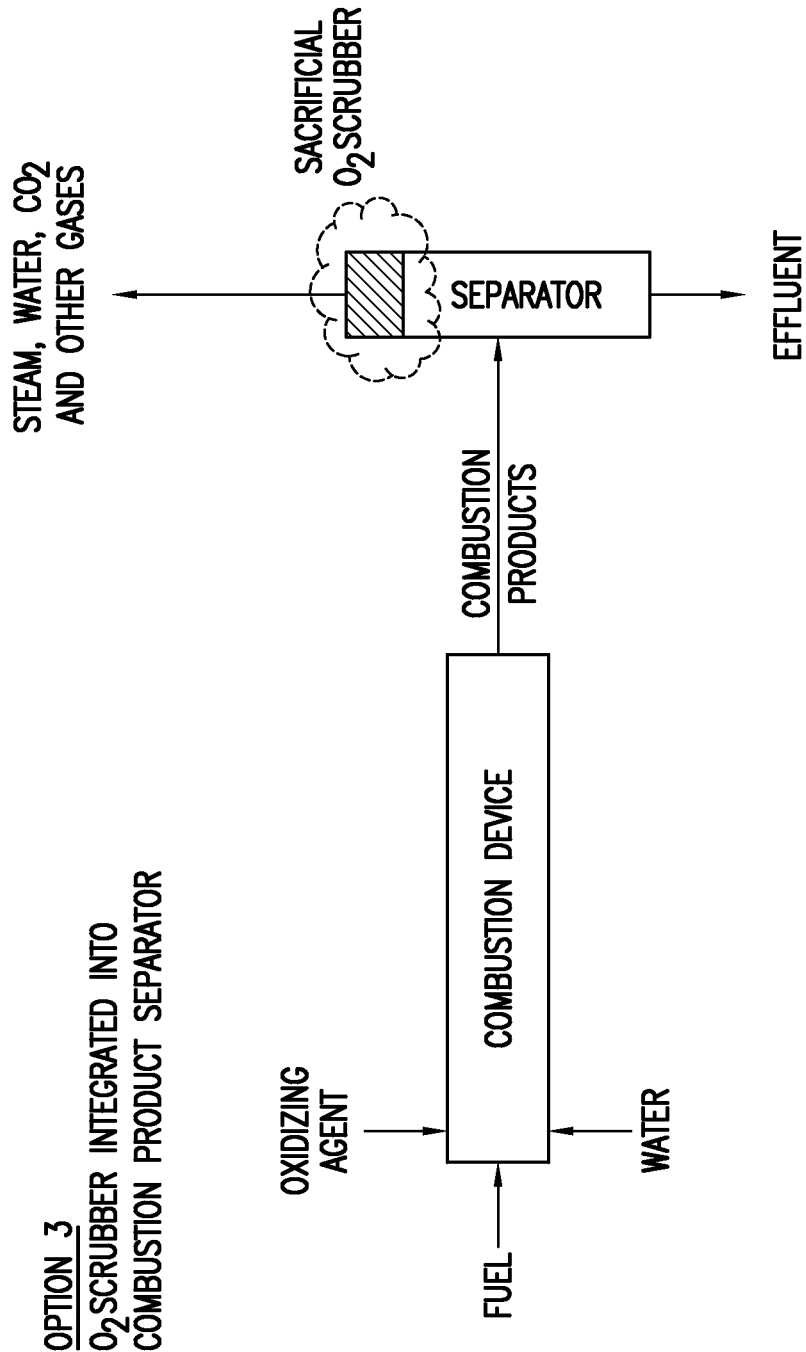
FIG. 3 is a schematic for the removal of oxygen from a combustion product stream via a scrubber integrated into a separator, according to one embodiment of the invention.
Figure 4:
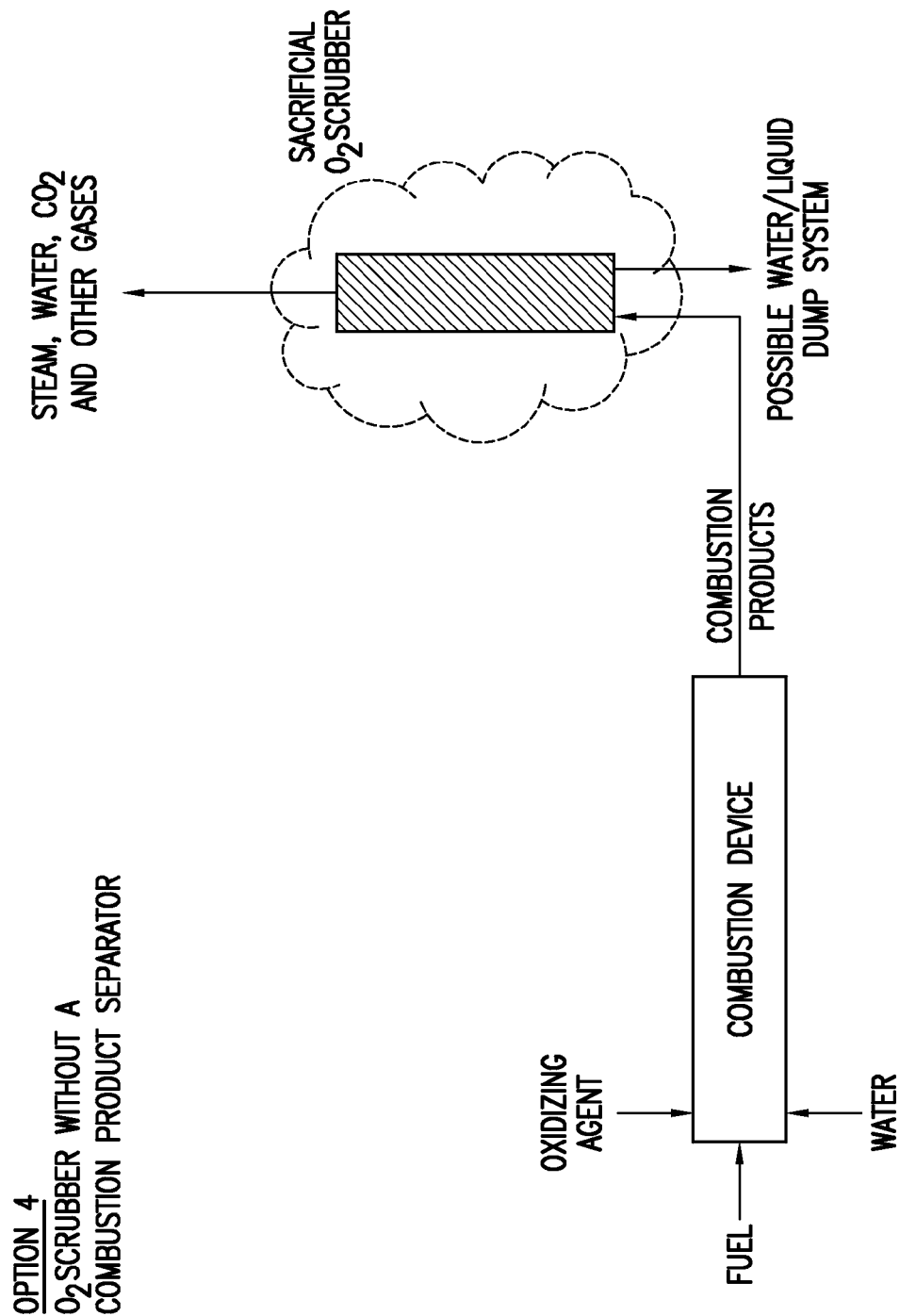
FIG. 4 is a schematic for the removal of oxygen from a combustion product stream via a scrubber without the need for a separator, according to one embodiment of the invention.

FIG. 3 depicts an embodiment wherein the scrubber is integrated into the separator. FIG. 4 depicts an embodiment with a scrubber without the need for a separator.

Direct combustion devices may be considered for use as a source of steam for power generation applications. These applications face the same challenges of corrosion from oxygen entrained in combustion products. Utilizing a scrubber to remove oxygen, as described above, may also be also be applied to power generation applications.

In closing, it should be noted that the discussion of any reference is not an admission that it is prior art to the present invention, especially any reference that may have a publication date after the priority date of this application. At the same time, each and every claim below is hereby incorporated into this detailed description or specification as a additional embodiments of the present invention.

To avoid down-time while replacing or regenerating the scavenging material the scrubbers may be arranged in parallel, where by, while one unit is in operation, a second is being recharged, maintained or replaced during this time the non-operating unit is isolated from the flow streams by methods such as valves. When the operating unit needs recharged, maintained or replaced the flow is directed to it while the originally operating unit is isolated. There may be multiple units similarly arranged and managed.

Direct combustion devices may consider for use to purify water streams both in oil field and other applications such as desalination. These applications face the same challenges of corrosion from oxygen entrained in combustion products. Utilizing a scrubber to remove oxygen, as described above, may also be also be applied to power generation applications.

Although the methods described herein have been described in detail, it should be understood that various changes, substitutions, and alterations can be made without departing from the spirit and scope of the invention as defined by the following claims. Those skilled in the art may be able to study the preferred embodiments and identify other ways to practice the invention that are not exactly as described herein. It is the intent of the inventors that variations and equivalents of the invention are within the scope of the claims while the description, abstract and drawings are not to be used to limit the scope of the invention. The invention is specifically intended to be as broad as the claims below and their equivalents.

The invention claimed is:

1. A method comprising:
    a) supplying fuel, oxidant and water into a direct combustion device;
    b) combusting the fuel, oxidant and water in the direct combustion device to produce a combustion products stream, wherein the combustion products stream includes steam with oxygen; and
    c) delivering the combustion products stream to a scrubber for removal of oxygen, wherein the scrubber includes a material capable of reacting with the oxygen and is in a separator for splitting a liquid effluent from gases in the combustion products stream.

2. The method according to claim 1, wherein the material is iron.

3. The method according to claim 1, wherein the material is a wool structure.

4. The method according to claim 1, wherein the material is structured to provide a flow path therethrough.

\* \* \* \* \*